Patented May 23, 1933

1,910,489

UNITED STATES PATENT OFFICE

HERBERT A. LUBS, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS FOR THE PREPARATION OF AMINO-THIAZOLES

No Drawing.   Application filed May 18, 1929. Serial No. 364,311.

This invention relates to a method of preparing aryl-amino-thiazoles, and specifically an improved method of making aryl-amino-thiazoles from thioureas and homologous compounds.

There are known methods for the preparation of amino-benzo-thiazoles as, for example, an article by Hunter in the Journal of the London Chemical Society, vol. 130, page 1186 (1927) describes the preparation of amino-benzo-thiazoles by the action of bromine on various phenyl thioureas suspended in chloroform. This process works fairly smoothly, but there is in certain cases a tendency toward nuclear substitution of bromine. It is also possible to use chlorine instead of bromine in the above reaction, but in general the progress of the reaction is not as smooth as is desirable.

This invention has for an object the preparation of aryl-amino-thiazoles by a method which is easily controlled and which proceeds with a greater degree of smoothness than it has heretofore been possible to attain. Other objects will appear hereinafter.

It has been discovered that if an aryl thiourea is suspended in a suitable liquid such as, for example, chlorbenzene or ortho-dichlorbenzene, and the suspension is then treated with sulfuryl chloride, a reaction readily takes place with the formation of an aryl-amino-thiazole. The invention can be illustrated by the following examples:

Example 1

20 g. of p-ethoxy-phenyl thiourea, is suspended in 200 g. of chlorbenzene and

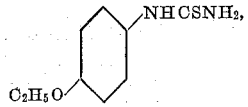

30 g. of sulfuryl chloride added. The mass warms up somewhat. After stirring for a short time the crystals formed are filtered off. This material is most probably the hydrochloride of the p-ethoxy-amino-benzo-thiazol of the possible constitution,

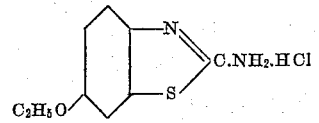

To prepare the free amino thiazole the hydrochloride can be dissolved or suspended in water and neutralized with alkali. The free thiazole can then be filtered off and dried. The free thiazole has a melting point of about 163° C.

Example 2

20 g. of o-tolyl thiourea suspended in 200 g. of chlorbenzene, when treated with 30 g. of sulfuryl chloride as described in Example 1 gives 90–95% of the theoretical yield of o-tolyl amino thiazole,

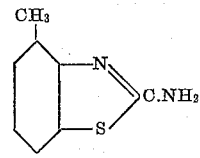

The free thiazole has a melting point of about 136° C.

Example 3

20 g. of 4-chlor-2-methyl phenyl thiourea,

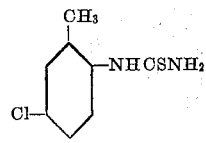

suspended in 200 g. of chlorbenzene and treated with 30 g. of sulfuryl chloride as described in Example 1 yields about 22 g. of the hydrochloride of chlor-methyl-aminobenzo-thiazole, which as the free base has the formula

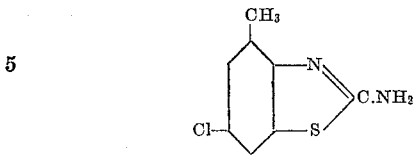

and has a melting point of about 203° C.

Example 4

By the substitution of p-tolyl thiourea,

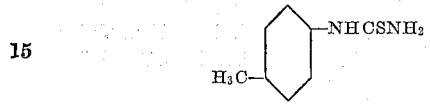

for the o-tolyl derivative described in Example 2, a thiazole of the composition

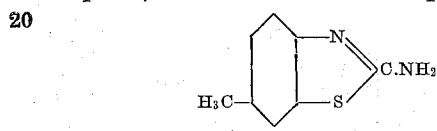

can be obtained. This compound has a melting point of about 142° C.

Example 5

10 g. of diorthotolyl thiourea are suspended in 100 g. of chlorbenzene. Upon the addition of 20 g. of sulfuryl chloride vigorous action occurs, with the formation of a clear solution. After standing for a short time a separation of clean white crystals occur which can be filtered off. This product can then be suspended in water and neutralized with alkali to obtain a thiazolic body of the probable composition

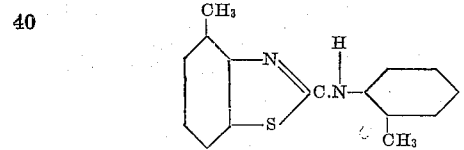

This compound has a melting point of about 135° C.

Example 6

S-methyl phenyl thiocarbamide, $$C_6H_5NHCSNHCH_3,$$

suspended in chlorbenzene and treated with sulfuryl chloride, as described in Example 1, gives the methyl-amino-benzo-thiazole,

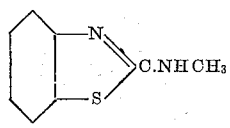

The free thiazole has a melting point of about 138° C.

Instead of the symmetrical methyl phenyl thiocarbamide, use may also be made in this reaction of the dimethyl phenyl thiocarbamide, thus obtaining as an end product dimethyl-amino-benzo-thiazole.

Example 7

To 10 g. of a-naphthyl thiourea suspended in 100 g. of chlorbenzene is added 20 g. of sulfuryl chloride. The reaction mass is then warmed to 50–60° whereupon a vigorous action occurs. The mass is then allowed to cool, and filtered. The precipitate is then suspended in water and neutralized with alkali whereby the free amino naphthiazole is obtained. This compound has a melting point of 235–237° C.

It has been found that the improved process is generally applicable to thioureas of the type

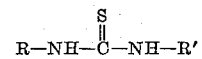

in which R is an aryl radical which may contain halogen, alkyl, alkoxy or aryl substituents, but which has one position ortho to the NH group free, and in which R' is either hydrogen, an aryl or an alkyl group. Throughout this specification and in the appended claims use has been made of the word "aryl" to mean the unsubstituted as well as the substituted $C_6H_5$-nucleus, it being understood that a $C_6H_5$ nucleus, which is a part of a condensed ring system (for example, that in the naphthyl nucleus disclosed in Example 7) is covered by this definition.

For the liquid used as a suspension agent, instead of chlorbenzene as specified throughout in the examples above, orthodichlorbenzene can be used, or ethylene dichloride or, in general, any medium of sufficiently high boiling point which is not adversely affected by either the thiourea or the sulfuryl chloride, and which serves to disperse the thiourea and make it possible for the sulfuryl chloride to come into intimate contact with it.

In the last step of the process, any solution of an alkaline substance which is sufficiently strong to convert the thiazole hydrochloride to the pure thiazole without decomposing the thiazole may be employed. Thus, alkaline hydroxides or alkaline carbonates or bicarbonates may be employed, as well as any similar substance of the same characteristics and the same degree of alkalinity.

In the first stage of the process the temperature for the reaction depends upon the particular thiourea employed. In most cases little, if any, external heat is necessary, but in some cases the reaction may require external heat at least until the reaction is well under way.

I do not wish to be limited to the particular preparations of reagents shown in the examples, nor the particular conditions outlined above. Many variations can be made without affecting the spirit of the invention, which I have illustrated in the foregoing examples.

I do not wish to be limited except as I have limited myself in the following claims:

I claim:

1. The process of preparing p-ethoxy-amino-benzothiazol which comprises adding sulfuryl chloride to p-ethoxy-phenyl thiourea suspended in chlorbenzene, agitating the suspension, filtering off the precipitate formed and treating the precipitate with an aqueous alkaline solution.

2. The process of preparing p-ethoxy-amino-benzothiazol which comprises adding sulfuryl chloride to p-ethoxy-phenyl thiourea suspended in a liquid which is non-reactive to the substances being reacted, and treating the precipitate formed thereby with an alkaline solution.

3. The process of preparing amino-aryl-thiazoles which comprises treating an aryl thiourea with sulfuryl chloride and treating the product formed thereby with an alkaline solution.

4. The process of preparing amino-aryl-thiazoles which comprises adding sulfuryl chloride to a substance of the class represented by:

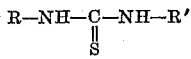

(in which R is an aryl nucleus having one position ortho to the NH group free, and in which R' is a member of the class comprising hydrogen, alkyl groups and aryl groups.)

5. The process of preparing amino-aryl-thiazoles which comprises adding sulfuryl chloride to a substance of the class represented by:

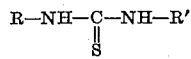

(in which R is an aryl nucleus containing a substituent from the class comprising halogen, alkyl and alkoxy groups, and in which R' is a member of the class comprising hydrogen, alkyl groups and aryl groups.)

6. A process for producing amino thiazole compounds of the general formula:

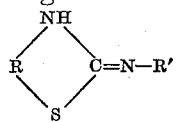

wherein R is an aryl radical which may contain further substituents and wherein R' means hydrogen or an aryl radical, which comprises treating with sulfuryl chloride a thiourea derivative of the general formula:

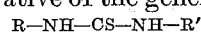

wherein R and R' have the aforesaid signification, under such conditions that R and R' of the thiourea remain unchanged, and treating the resulting amino aryl thiazole hydrochloride with an alkaline solution to form the pure amino aryl thiazole without decomposition of the same.

In testimony whereof I affix my signature.

HERBERT A. LUBS.

CERTIFICATE OF CORRECTION.

Patent No. 1,910,489.                                   May 23, 1933.

HERBERT A. LUBS.

It is hereby certified that error appears in the printed specification of the above numbered patent requiring correction as follows: Page 1, the formula appearing under "Example 1," at lines 39 to 43 inclusive, should follow the word "thiourea," in line 37; and that the said Letters Patent should be read with this correction therein that the same may conform to the record of the case in the Patent Office.

Signed and sealed this 15th day of August, A. D. 1933.

M. J. Moore.

(Seal)                                        Acting Commissioner of Patents.